Jan. 24, 1967  R. C. WALTER  3,300,745

LOW PRESSURE TRANSDUCER

Filed Feb. 19, 1964  2 Sheets-Sheet 1

INVENTOR.
RICHARD C. WALTER
BY Seed & Berry
ATTORNEYS

Jan. 24, 1967  R. C. WALTER  3,300,745
LOW PRESSURE TRANSDUCER
Filed Feb. 19, 1964  2 Sheets-Sheet 2
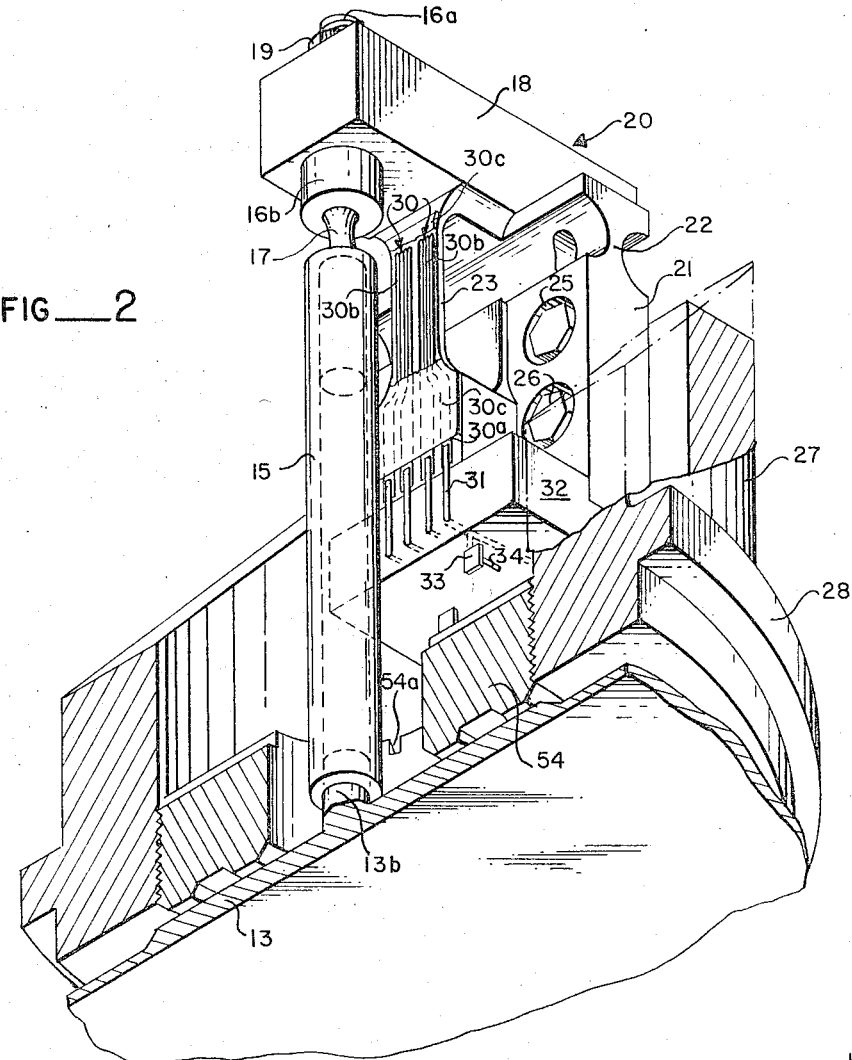
FIG_2
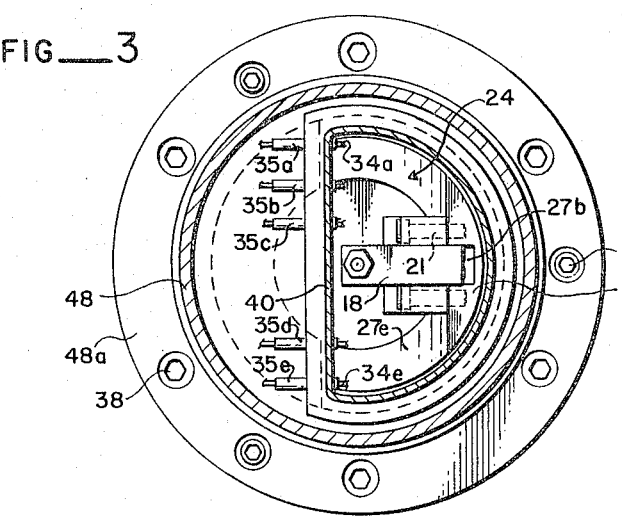
FIG_3
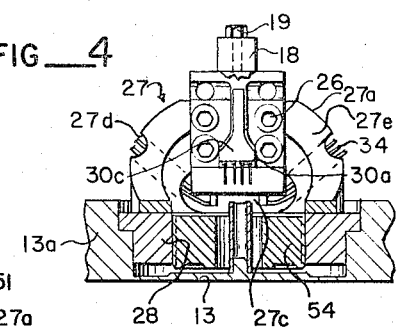
FIG_4
RICHARD C. WALTER
INVENTOR.
BY *Seed & Berry*
ATTORNEYS

United States Patent Office 3,300,745
Patented Jan. 24, 1967

---

3,300,745
LOW PRESSURE TRANSDUCER
Richard C. Walter, Lynnwood, Wash., assignor to Standard Controls, Inc., a corporation of Washington
Filed Feb. 19, 1964, Ser. No. 345,948
7 Claims. (Cl. 338—4)

The present invention relates to a low pressure transducer of the general type in which strain responsive elements are tensioned or compressed responsive to fluid pressure load to be measured, monitored or recorded. The resulting change in electrical resistance is determined as by a Wheatstone bridge circuit to indicate a pressure reading.

An important object of the invention is to provide a low pressure transducer in which the fluid whose pressure is to be determined is isolated from the strain responsive elements, and is confined to a chamber within the transducer which has high corrosion resistance.

Another important object of the invention is to provide a low pressure transducer which has good linearity and very little hysteresis.

The invention also aims to provide a low pressure transducer which has good shock resistance and yet is of small and compact configuration.

A further object is to provide such a unit having good temperature characteristics and having temperature isolation of the fluid relative to the strain responsive elements.

Other more particular objects and advantages of the invention will, with the foregoing appear and be understood in the course of the following description and claims, the invention consisting in the novel construction and in the adaptation and combination of parts hereinafter described and claimed.

In the accompanying drawings:

FIG. 2 is a detailed perspective view, partly in longitudinal section, of the diaphragm and related strain gauge assembly in the transducer.

FIG. 3 is a transverse cross-section taken as indicated by the line 3—3 of FIG. 1.

FIG. 4 is a detail view to reduced scale taken as shown by line 4—4 in FIG. 1.

Figure 1:
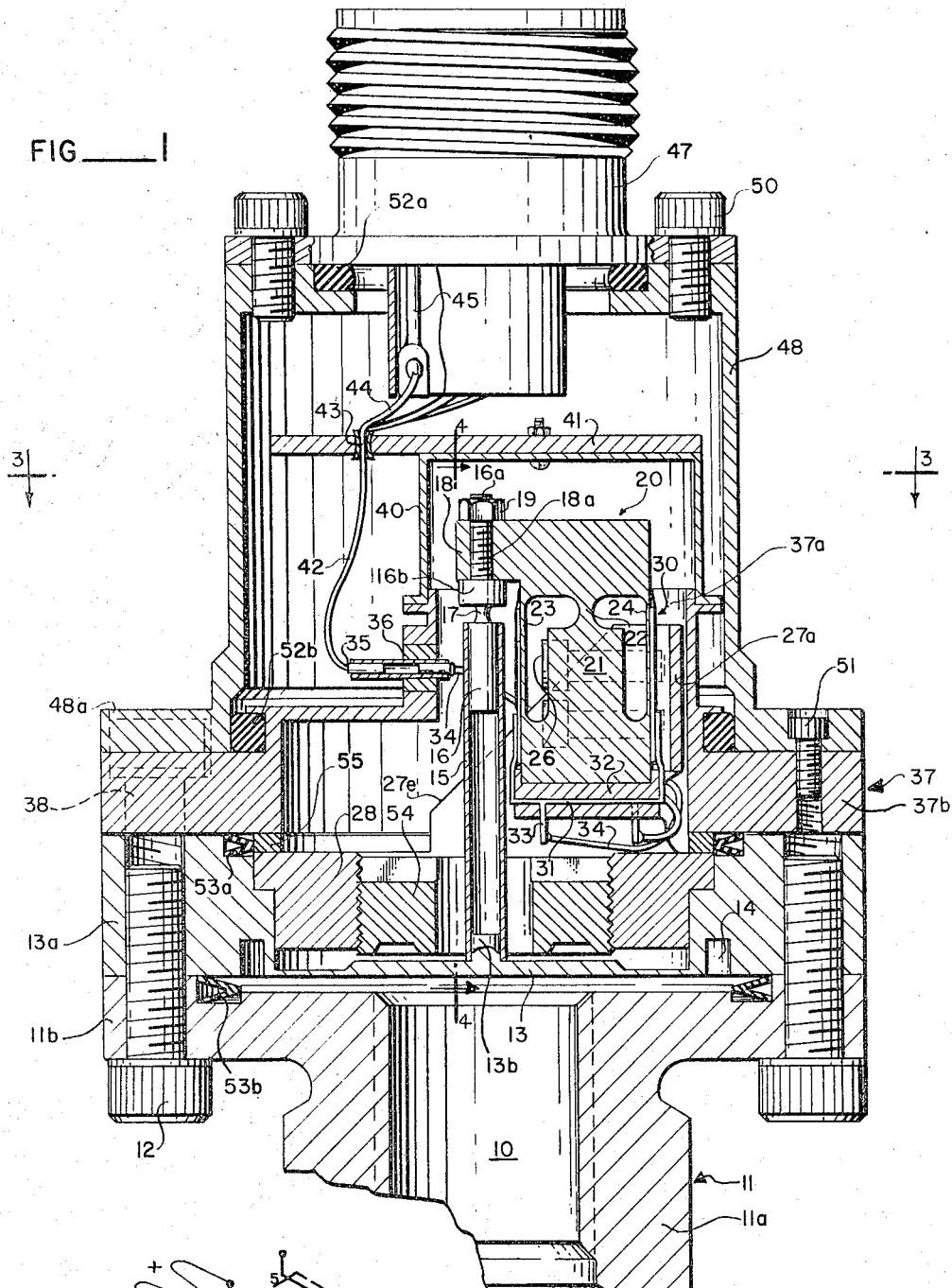
FIG. 1 is longitudinal vertical sectional view of a transducer embodying the present invention.

Referring to the drawings it is seen that a pressure chamber 10 is provided by an adapter 11 formed with a screw neck 11a and a mounting ring 11b. Bolted to the latter at 12 is the enlarged rim 13a of a metal diaphragm 13 surrounded by an isolation groove 14. This diaphragm 13 has a center stud 13b onto which is welded a tubular push rod 15 having its other end welded to a fulcrum pin 16 necked centrally to provide a fulcrum 17. At its end opposite from the push rod 15 the fulcrum pin has a threaded extension 16a which extends through an opening 18a in the cantilevered end of a beam 18 to receive a nut 19 which together with a central integral collar 16b bear against opposite faces of the cantilevering portion of the beam.

As seen in FIGURES 1–2, the beam 18 is an integral part of a strain gauge assembly indicated generally at 20. The body 21 of this assembly, including the beam 18, is of one piece construction preferably fabricated from a piece of aluminum which is anodized after machining. The beam is connected to the rest of the body 21 of the strain gauge assembly by a hinge 22 and a pair of webs 23–24 spaced on opposite sides of the hinge. Beneath these webs the gauge body is of a general cross configuration in transverse cross-section with two arms of the cross continuing upwardly to the hinge 22 and each having a pair of counter-bored openings 25 therethrough for receiving screws 26 securing the strain gauge assembly onto a mounting element 27 in turn having a base ring 28 seated within the diaphragm rim 13a.

Figure 5:
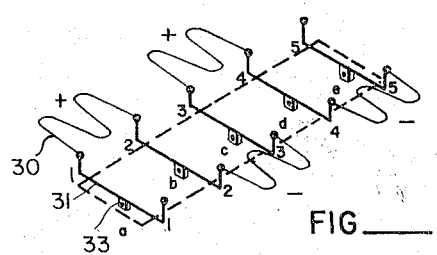
FIG. 5 is a schematic view of the wiring of the base of the strain gauge assembly.

A pair of strain responsive elements 30 is mounted on each of the webs 23–24 and each may be of the type comprising a sheet of foil etched to provide a pair of flat enlarged end terminals 30a interconnected by a series of parallel loops 30b shown by full lines in FIG. 2. These strain elements are bonded directly to the webs 23–24 which, by having an anodized surface, provide the necessary electrical insulation. The strain elements prior to mounting are carried on a thin epoxy sheet 30c (partly broken away in FIG. 2) which covers the elements for mounting on the webs. The portion of this sheet 30c overlying part of the terminals 30a is scraped away to expose the terminals which are thereupon soldered to respective of five parallel leads 31a–31e. These leads extend through an insulating block 32 which fits over the bottom end of the body 21 of the strain gauge assembly and presents five downwardly projecting terminal eyes 33a–e. Each of these eyes is connected within the block 32 to a respective one of the leads 31, and each of the latter projects endwise by its ends beyond the ends of the block and is bent upwardly to overlap one of the strain gauge terminals 30a and have a solder connection therewith. The wiring arrangement is indicated schematically in FIGURE 5 wherein the two "plus" loops represent the pair of strain elements 30 in the web 23 and the two "minus" loops denote the pair of strain elements on the other web 24. It will be noted that one end each of the first and last leads 31a and 31e are not used. Leads 34 connect the eyes 33 with five respective tubular terminals 35a–e which are secured by potting 36 in the neck 37a of a retainer 37. This retainer has an annular mounting flange 37b held by bolts 38 to the diaphragm rim 13a and has its neck 37a covered by a lid 40 carrying a terminal board 41. The terminals 35a and 35e are cross-connected by a compensating coil (not shown) to balance the resistances of the strain elements 30 and their leads such that terminals 35a, 35b, 35c and 35d become the four corners of a Wheatstone bridge circuit.

Leads 42 connect the four terminals 35a–d with respective eyelets 43 in the terminal board and the eyelets are in turn connected by leads 44 to the inner ends of terminal prongs 45 extending through an insulating plate (not shown). This plate is carried on the lower end of an electrical connector 47 which seats in the top of a cover 48, having a base flange 48a. Respective sets of screws 50–51 secure the connector 47 to the cover 48 and mount the base flange of the latter onto the flange 37b of the retainer 37. O-rings 52a–b seal the chambers surrounding the lid 40. Similarly, sealing rings 53a–b of a V cross-section are positioned between the diaphragm rim 13a and the abutting faces of the lids 40 and adapter 11.

Returning to the mounting element 27 which seats within the rim of the diaphragm 13 and holds the strain gauge assembly, such has a concavo-convex upstanding wall 27a having a central vertical groove 27b formed in its inside face and having a pair of upper downwardly sloping faces 27e—27e. The groove 27b receives part of the body 21. Beneath this groove is a transverse slot 27c for passage of the leads 34 which continue therefrom along diagonal grooves 27d in the outer face of the wall 27a in their path to the terminals 35.

The base ring 28 is internally threaded to receive a ring nut 54 surrounding the push rod 15. This ring nut serves as a stop to limit flexure of the diaphragm 13 and has radial grooves 54a on its upper face for receiving a spanner wrench to adjust the stop. A spacing ring 55 bears against the upper end of the base ring 28 by pressure thereon of the base flange 37d of the retainer 37.

When the unit is in operation the neck 11a of the adapter 11 is connected to suitable tubing from the fluid to be monitored so that the fluid is in communication with the chamber 10, and hence acts upon the diaphragm 13. The flexure of the diaphragm responsive to an increase in fluid pressure pushes or compresses the rod 15 and deflects the beam 18 via the fulcrum pin 16. This deflection causes a pivoting of the beam 18 around its hinge 22 in a manner tensioning the web 23 and compressing the web 24. During this action there is a slight hinging at the fulcrum 17. As a result of the action on the webs 23–24 the strain responsive elements 30 on the web 23 are increased in electrical resistance while the elements on the web 24 are decreased in electrical resistance. These changes in resistance are in direct proportion to the change in fluid pressure on the diaphragm and are measured by instrumentation of the bridge circuit in the manner well-known in the art. Similarly, decreases in the fluid pressure result in opposite deflection of the beam 18 thereby causing an opposite effect upon the strain responsive elements.

Since the strain gauge assembly is completely isolated from the fluid chamber 10 the pressure of highly corrosive fluids may be measured without endangering the strain gauge mechanism. All that is necessary is that the diaphragm 13, the adapter 11 and sealing ring 53b therebetween be constructed of corrosive-resistant material such as stainless steel. It will be noted that the spacing of the diaphragm 13 and the beam 18 as well as the gap between the strain responsive elements and the diaphragm, holds temperature effects due to temperature changes in the fluid, to a minimum. Also, since both of the webs 23–24 are integral with the beam 18, temperature changes in the beam will be equally reflected in the webs, thus maintaining all of the strain responsive elements in the same temperature condition.

It is believed that the invention will have been clearly understood from the foregoing detailed description of my now-preferred illustrated embodiments. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In a pressure transducer, diaphragm means; mounting means mounting said diahpragm means; and a strain gauge assembly mounted on said mounting means and comprising a cantilevered beam in parallel spaced relationship to said diaphragm, a body having a hinge interconnecting said body and said beam such that said beam can pivotally deflect about said hinge, strain responsive means including a pair of webs connected at opposite ends to said body and to said beam at opposite sides of said hinge such that pivotal deflection of said beam substantially longitudinally stresses said webs, one in tension and the other in compression, and including strain responsive elements bonded to said webs to indicate the tension and compression therein, said beam, body, hinge, and webs being integrally formed; and means interconnecting the cantilevered end of said beam and the center of said diaphragm whereby flexure of said diaphragm results in deflection of said beam thereby tensioning one of said webs and compressing the other of said webs.

2. In combination with the structure of claim 1, a lid secured to said diaphragm rim and enclosing said strain gauge assembly and the respective face of said diaphragm, and electrical leads passing through said lid and having operatitve connection with said strain responsive elements.

3. In combination with the structure of claim 1, stop means threaded within the base of said mounting element and concentric relative to said diaphragm whereby turning of said stop means adjusts the gap between the stop means and said diaphragm to determine maximum deflection of the diaphragm.

4. The structure of claim 1 in which said webs are aluminum and each have an anodized surface to which the respective of said strain responsive elements are bonded.

5. In a low pressure transducer, a circular diaphragm having an integral outer rim of increased thickness, a mounting element having a base ring seated in said rim in spaced relation to said diaphragm, a stop ring threaded in said base ring for limiting deflection of said diaphragm relative to said mounting element, a post secured at the center of said diaphragm and projecting through a center of said stop ring in spaced relationship thereto, a strain gauge assembly having a body mounted on said mounting element and presenting a beam integral with said body and connected thereto by a hinge and a pair of webs located at opposite sides of said hinge, said beam being in parallel spaced relationship to said diaphragm and having a cantilevering end overlying the center of the diaphragm and connected to said post whereby deflection of the diaphragm is transmitted by said post to said beam and causes a bending thereof about said hinge and a responsive tensioning of one of said webs and compression of the other web, and strain responsive elements mounted on said webs.

6. The structure of claim 5 in which said post comprises a hollow tube interfitting with the center portion of said diaphragm and having its opposite ends sleeved over a fulcrum pin which is centrally necked to provide a fulcrum and which extends into the cantilevering end of said beam.

7. In a low pressure transducer, diaphragm means; and a strain gauge assembly comprising a beam connected to said diaphragm, a body having integral hinge means interconnecting said body and said beam such that said beam pivotally deflects about said hinge means responsive to deflection of said diaphragm, and strain responsive means including thin webs connected at opposite ends to said body and to said beam at opposite sides of said hinge means such that pivotal deflection of said beam substantially longitudinally stresses said strain responsive means, one in tension and the other in compression.

References Cited by the Examiner

UNITED STATES PATENTS

| 2,737,051 | 3/1956 | Sanderson | 73—398 |
| 2,859,613 | 11/1958 | Green | 73—141 |
| 2,957,350 | 10/1960 | Kolb | 73—398 |
| 3,022,672 | 2/1962 | Dimeff et al. | 73—398 |
| 3,060,396 | 10/1962 | Gibbs et al. | 73—398 X |
| 3,138,027 | 6/1964 | Li | 73—398 |

OTHER REFERENCES

"The SR-4 Bonded Wire Strain Gage" by Bean, Dec. 3, 1956, pages 5–10 and curve sheet 2 relied on.

LOUIS R. PRINCE, *Primary Examiner.*

DONALD O. WOODIEL, *Assistant Examiner.*